United States Patent
Kobayashi et al.

[11] Patent Number: 5,423,392
[45] Date of Patent: Jun. 13, 1995

[54] ENGINE CONTROL SYSTEM

[75] Inventors: Hideki Kobayashi; Masaki Fujii; Hiroyuki Matsumoto, all of Hiroshima, Japan

[73] Assignee: Mazda Motor Corporation, Japan

[21] Appl. No.: 212,808

[22] Filed: Mar. 15, 1994

[30] Foreign Application Priority Data

Mar. 15, 1993 [JP] Japan .................. 5-081379

[51] Int. Cl.$^6$ .................. B60K 28/16
[52] U.S. Cl. .................. 180/197; 364/426.02; 364/426.03
[58] Field of Search .................. 180/197; 364/426.02, 364/426.03

[56] References Cited

U.S. PATENT DOCUMENTS

| | | | |
|---|---|---|---|
| 5,099,942 | 3/1992 | Kushi et al. | 180/197 |
| 5,168,954 | 12/1992 | Nakaniwa et al. | 180/197 |
| 5,198,982 | 3/1993 | Kobayashi | 180/197 |
| 5,201,383 | 4/1993 | Kitigawa et al. | 180/197 |
| 5,282,137 | 1/1994 | Suzuki et al. | 180/197 |
| 5,283,742 | 2/1994 | Wazaki et al. | 180/197 |
| 5,287,279 | 2/1994 | Anan | 180/197 |
| 5,291,965 | 3/1994 | Takata | 180/197 |

FOREIGN PATENT DOCUMENTS 63-5116 11/1988 Japan .

Primary Examiner—Mitchell J. Hill
Attorney, Agent, or Firm—Fish & Richardson

[57] ABSTRACT

For an internal combustion engine with a supercharger, a slip of the driven wheel is controlled by reducing torque of the engine, when the extent of the slip becomes large in relation to a road surface. When the running status of the engine exists in a non-supercharging region, the slip is controlled by at least one of operations for reducing the amount of fuel to be supplied to the engine and for retarding the timing of ignition (first slip control). On the other hand, in a supercharging region, the slip is controlled by lowering the pressure to be supercharged (second slip control). In a transient period of time when the running status of the engine is caused to shift from the non-supercharging region to the supercharging region when the first slip control is being conducted in the non-supercharging region, the first slip control is allowed to be continued until the slip is caused to be converged, in place of the second slip control.

15 Claims, 3 Drawing Sheets

ENGINE CONTROL SYSTEM

BACKGROUND OF THE INVENTION

1. Field of the Invention

The present invention relates to an engine control system and, more particularly, to improvements of an engine control system for suppressing a slip by reducing torque of the engine when the vehicle body causes a slip.

2. Description of the Related Art

Heretofore, for example, Japanese Patent Unexamined Publication No. (Kokai) 63-5,116 discloses the technology of suppressing a slip of the vehicle body by reducing torque of the engine by restricting the supercharging action, i.e. when the action of increasing the power of the engine by supplying fuel or air above the normal pressure, when a slip of the vehicle body is detected on the basis of a difference between driven and undriven (following) wheels of the vehicle. Further, it is known that the slip can be suppressed by reducing torque of the engine by ceasing the supply of fuel to a portion of cylinders or by retarding the timing of ignition, when the vehicle body causes a slip.

The slip of the vehicle body can be suppressed with high responsiveness when the supply of fuel to the cylinders of the engine is ceased or when the timing of ignition is retarded. On the other hand, responsiveness cannot be said sufficient when the slip of the vehicle body is suppressed by restricting the supercharging action, for example, by reducing the supercharging pressure, i.e. the pressure to be supercharged or to be increased above the normal pressure, by opening a bypath control valve disposed for bypassing a mechanical supercharger, because an operation of the bypath control valve is delayed to some extent. For this reason, generally, higher demands are made to suppress the slip of the vehicle body by ceasing the supply of fuel or by retarding the timing of ignition or by combining them than by restricting the supercharging action.

For an internal combustion engine with a supercharger, however, an after-burning phenomenon is caused to occur if the supply of fuel to a portion of the cylinders is ceased in a supercharging region in which the rate of intake air is high, thereby elevating the temperature of the exhaust gases and adversely affecting thermal durability of an exhaust system, an after-burning phenomenon being the event that unburned ingredients of exhaust gases withdrawn from the cylinders of the engine, where combustion is being carried out in normal conditions, are caused to be burned in an exhaust passage as a result of reaction with oxygen present therein in a high concentration. Even when the timing of ignition is retarded in a supercharging region where the power of the engine is increased above the normal pressure, with the attempt to suppress the slip of the vehicle body, such an after-burning phenomenon may likewise be caused to occur resulting in exerting an adverse influence upon thermal durability. Accordingly, the idea may arise that, for an internal combustion engine with a supercharger, the slip of the vehicle body is to be suppressed by restricting the supercharging operation in such a supercharging region and by ceasing the supply of fuel or retarding the timing of ignition in a non-supercharging region where no pressure is to be supercharged or the power of the engine should not be increased above the normal pressure.

With the arrangement of a slip control system for an internal combustion engine with a mechanical supercharger such that the slip can be reduced in the supercharging region by restricting the supercharging operation and in the non-supercharging region by ceasing the supply of fuel or retarding the timing of ignition, however, problems may occur that the extent to which the slip of the vehicle body is caused to be reduced may be worsened if the vehicle would be accelerated during a period of time when the slip is still being controlled in the non-supercharging region by ceasing the supply of fuel to the cylinders of the engine and/or by retarding the timing of ignition and, consequently, if the non-supercharging region would be shifted to the supercharging region. Upon the shift into the supercharging region, the control of the slip is also required in usual cases to be shifted to a fashion in which the slip is to be reduced by restricting the supercharging operation; however, as described hereinabove, the mechanical supercharger may cause a delay in starting the operation for restricting the supercharging operation of the engine. As a result, no slip can be controlled until the supercharging operation is begun and, on the contrary, the slip may be caused to be increased again even once the slip is going to be reduced by ceasing the supply of fuel or by retarding the timing of ignition, thereby impairing the extent of convergence of the slip.

SUMMARY OF THE INVENTION

The object of the present invention is to provide an engine control system for an internal combustion engine, which can solve the problems as described hereinabove and which is so adapted as to prevent the extent of convergence of the slip of the vehicle body from being worsened during a given period of time immediately after the running status of the engine has been shifted to the supercharging region from the non-supercharging region by accelerating the vehicle body during the control of the slip in the non-supercharging region by ceasing the supply of fuel or retarding the timing of ignition.

In order to achieve the aforesaid object, the present invention consists of an engine control system for an internal combustion engine with a supercharger so adapted as to implement a supercharging operation by the supply of intake air; comprising:

a supercharging-region determining means for determining a supercharging region on the basis of a predetermined condition;

a supercharging-operation controlling means for controlling a supercharging operation by implementing said supercharging operation by said supercharger when said supercharging region is determined by said supercharging-region determining means and by suspending said supercharging operation when said running status is determined thereby to be in a non-supercharging region;

a slip detecting means for detecting a slip of a driven wheel driven by said engine relative to a road surface;

a first slip control means for reducing torque of the engine by conducting at least one of operations for ceasing the supply of fuel to the engine and for retarding the timing of ignition when the slip is detected by said slip detecting means in the non-supercharging region determined by said supercharging-region determining means;

a second slip control means for reducing the torque of the engine by controlling said supercharger so as to lower a pressure to be supercharged prior to said supercharging-operation controlling means when said slip is detected by said slip detecting means in the supercharging region determined by said supercharging-region determining means; and a control continuing means for continuing a control operation for controlling the slip by said first slip control means during a transient period of time until said supercharging operation is begun after said running status has been shifted into said supercharging region from said non-supercharging region during the control by said first slip control means.

With the arrangement of the engine control system according to this invention as described hereinabove, the slip of the vehicle body can be controlled with high responsiveness by conducting the control of the slip by means of at least one of the operations for controlling the amount of fuel to be supplied to the engine or for retarding the timing of ignition when the running status of the engine is in the non-supercharging region in which no supercharging operation is being carried out. On the other hand, in the supercharging region where the supercharging operation is in process, the slip is controlled by restricting the supercharging operation, thereby preventing an after-burning from occurring and suppressing the temperature of exhaust gases from elevating due to such an after-burning phenomenon. Further, the arrangement of the engine control system according to this invention can enhance the extent of responsiveness to the control of the slip during such a transient period of time ranging from the time when the running status of the engine has been shifted during the control of the slip from the non-supercharging region to the supercharging region to the time when the supercharging operation is begun, by controlling the slip by restricting one of the operations for controlling the amount of fuel to be supplied to the engine and for retarding the timing of ignition.

The restriction of the supercharging operation during such a transient period of time is preferred in order to converge the slip of the driven wheels as quickly as possible. When the slip of the driven wheels is converged to a given level by the control of the slip during the transient period of time, then the control of the slip by restricting the amount of the fuel to be supplied to the engine or by retarding the timing of ignition is ceased and the supercharging operation is to be resumed in normal way.

Other objects, features and advantages of the present invention will become apparent in the course of the description of the preferred embodiments, with reference to the accompanying drawings.

DESCRIPTION OF THE PREFERRED EMBODIMENTS

The present invention will be described more in detail by way of examples with reference to the accompanying drawings.

Figure 1:
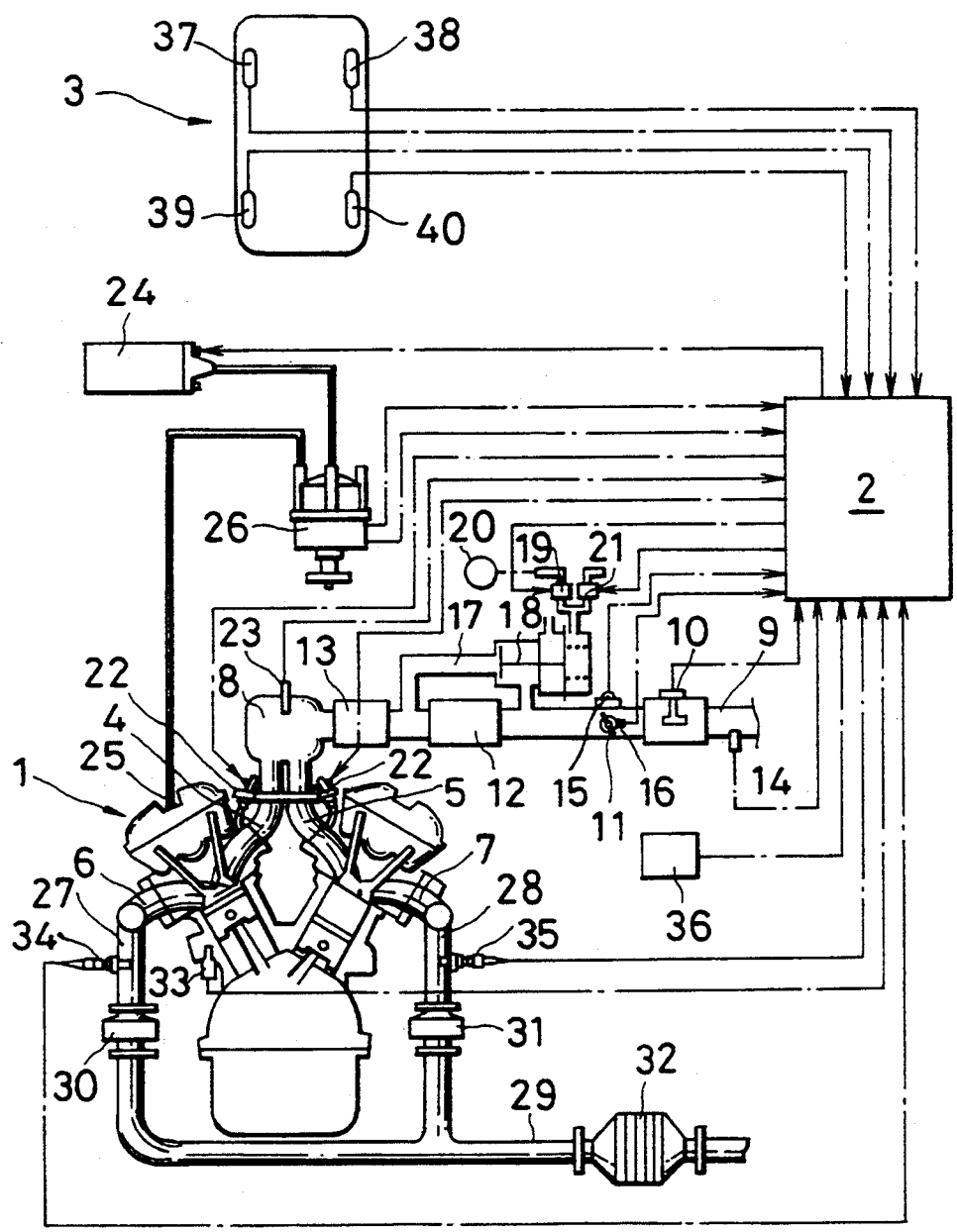
FIG. 1 is a block diagram showing an overall layout of the engine control system according to a first embodiment of the present invention.

As shown in FIG. 1, reference numeral 1 denotes a V-type internal combustion engine having six cylinders, reference numeral 2 denotes a control unit comprised of a microcomputer, and reference numeral 3 denotes a vehicle body driven with the engine 1.

The V-type engine has three cylinders arranged in each of its left and right cylinder banks in a V-shaped form. Each of the cylinders is provided with intake passages 4 and 5, each disposed at and extending into its inward side, as well as exhaust passages 6 and 7, each disposed at and extending into its outward side. Over a space formed between the left and right, V-shaped cylinder banks is mounted a surge tank 8 with which the intake passages 4 and 5 for each of the cylinders are connected. An inlet of the surge tank 8 is communicated with an upstream intake passage 9 disposed at its upstream side and extending from an air cleaner (not shown).

The upstream intake passage 9 is provided from its upstream side to its downstream side with an air flow sensor 10, a throttle valve 11, a mechanical supercharger 12 and an intercooler 13. The upstream intake passage 9 further has a sensor 14 for sensing the temperature of intake air mounted in the position upstream of the air flow sensor 10. To the throttle valve 11 is mounted an idle switch 15 and a throttle position sensor 16. The upstream intake passage 9 is provided in its upstream position with a bypath 17 bypassing the mechanical supercharger 12, which in turn has a bypath control valve (ABV) 18. The bypath control valve 18 has its actuator chamber connected with a negative pressure source 20, such as a vacuum pump or the like, through a first solenoid valve 19 and communicated with the open air through a second solenoid valve 21.

Each of the intake passages 4 and 5 for each cylinder is provided with a fuel injector valve 22 and the surge tank 8 is provided with a boost sensor 23.

An ignition system of the engine 1 comprises an ignition coil 24 for generating high voltage, a spark plug 25 disposed for each cylinder (although a portion of the spark plugs is shown in the accompanying drawings), and a distributer 26 for distributing the high voltage to each of the spark plugs 25.

An exhaust system of the engine 1 comprises the exhaust passages 6 and 7, merged exhaust passages 27 and 28 each formed by merging the respective exhaust passages 6 and 7, a downstream merged exhaust passage 29 formed by merging the merged exhaust passages 27 and 28 at their downstream sides, and catalyst 30, 31 and 32 disposed, respectively, in the merged exhaust passages 27, 28 and the downstream exhaust passage 29.

The control unit 2 is so arranged as to control the amount of fuel to be injected, the timing of ignition, the pressure to be supercharged, and the like, and as to control a slip of the driven wheel of the vehicle by ceasing the supply of fuel and by retarding the timing of ignition as well as by restricting the supercharging operation. The control unit 2 is supplied with a crank angle sensor signal and a cylinder sensor signal from the distributer 26, a signal indicative of the amount of intake air from the air flow sensor 10, a signal indicative of a boost pressure from the boost sensor 23, an idle switch signal from the idle switch 15, a signal indicative of the angle of an opening of the throttle valve 11 from the throttle position sensor 16, and a signal indicative of the temperature of the intake air from the sensor 14. In addition, the control unit 2 is fed with a signal indicative of the temperature of engine water from a water temperature sensor 33 for sensing the temperature of water to be supplied to the engine, a signal indicative of an air-to-fuel ratio from $O_2$ sensors 34 and 35, each mounted in the position upstream of the catalysts 30 and 31, respectively, and a signal indicative of the ambient pressure from an ambient pressure sensor 36. Furthermore, vehicle speed signals indicative of the speed of the vehicle body are supplied to the control unit 2 from the respective vehicle speed sensors disposed at the driven wheels 37 and 38 and the undriven (following) wheels 39 and 40.

In controlling the amount of the fuel to be supplied to each of the cylinders, a basic amount of the fuel to be supplied thereto is set on the basis of the number of engine revolutions (rpm) computed from the crank angle sensor signal and the amount of the intake air and it is then corrected in accordance with the temperature of water, the temperature of the intake air, the ambient pressure, and the like. Further, the corrected amount of the fuel is subjected to feedback correction on the basis of the signal indicative of the air-to-fuel to thereby give the amount of the fuel to be supplied to each of the cylinders. Each of the cylinders is fed with the fuel by driving the fuel injector valve 22 in accordance with the injection pulses, each having the pulse width corresponding to the amount of the fuel to be injected.

In controlling the timing of ignition in order to control the slip of the vehicle body, the angle at which the timing of ignition is retarded is determined on the basis of a map value predetermined in accordance with the number of engine revolutions computed from the crank angle sensor signals and ignition pulses are generated to the ignition coil 24 in accordance with the angle at which the timing of ignition is to be retarded.

Figure 2:
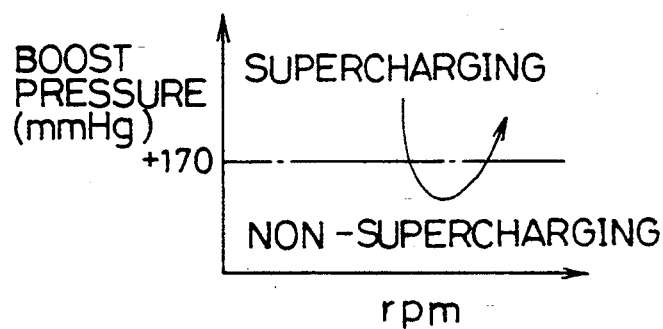
FIG. 2 is a graph showing an example for setting a supercharging region.

On the other hand, in order to control the pressure to be supercharged, a supercharging region is preset by the engine load (boost pressure) on the basis of, for example, a map as shown in FIG. 2. Specifically, for example, a region located in and above the boost pressure of 170 mmHg is set as a supercharging region and a region located below the boost pressure of 170 mmHg is set as a non-supercharging region. In such a supercharging region, a target pressure to be supercharged is read from a map preset on the basis of the number of engine revolutions and the angle of an opening of the throttle valve and the boost pressure (the pressure to be supercharged) is controlled so as to become or amount to such a target pressure by adjusting an amount of lifting the bypath control valve 18, i.e. the angle of an opening of the bypath control valve 18, by controlling the first and second solenoid valves 19 and 21. On the other hand, the bypath control valve 18 is opened to a full extent to thereby cease the supercharging operation in the non-supercharging region.

In order to control the slip of the vehicle body, whether the vehicle body is slipping is determined on the basis of the difference in wheel speed between the driven and undriven wheels. Specifically, it is decided that the vehicle body is slipping when the difference in the wheel speed between the driven wheels 36, 37 and the undriven (following) wheels 38, 39 is greater than a predetermined value. When it is decided that the slip of the vehicle body occurs in the supercharging region, the slip is controlled as a rule by opening the bypath control valve 18 by controlling the solenoid valves 19 and 21 so as for the supercharging pressure to be reduced in accordance with a level of the slip. On the other hand, when it is decided that the slip of the vehicle body occurs in the non-supercharging region, the slip is controlled by ceasing the supply of fuel to a portion of the cylinders and/or by retarding the timing of ignition in accordance with the slip level.

Further, for example, when the slip of the vehicle body occurs at the time when the running status of the engine is shifted from the non-supercharging region into the supercharging region and the vehicle is then accelerated shifting the running status of the engine again into the supercharging region from the non-supercharging region in the manner, as indicated by arrow in FIG. 2, without causing the slip to be converged, the control of the slip which has been carried out in the non-supercharging region is continued even during the transient period by ceasing the supply of fuel and/or by retarding the timing of ignition without supercharging even in the supercharging region, until the slip is caused to be converged. After the slip has been converged, the control of the slip, which has been continued, is then ceased and then the supercharging operation is begun in a normal way. In this case, it is preferred to gradually increase the power of the engine to a target pressure to be supercharged.

Figure 3:
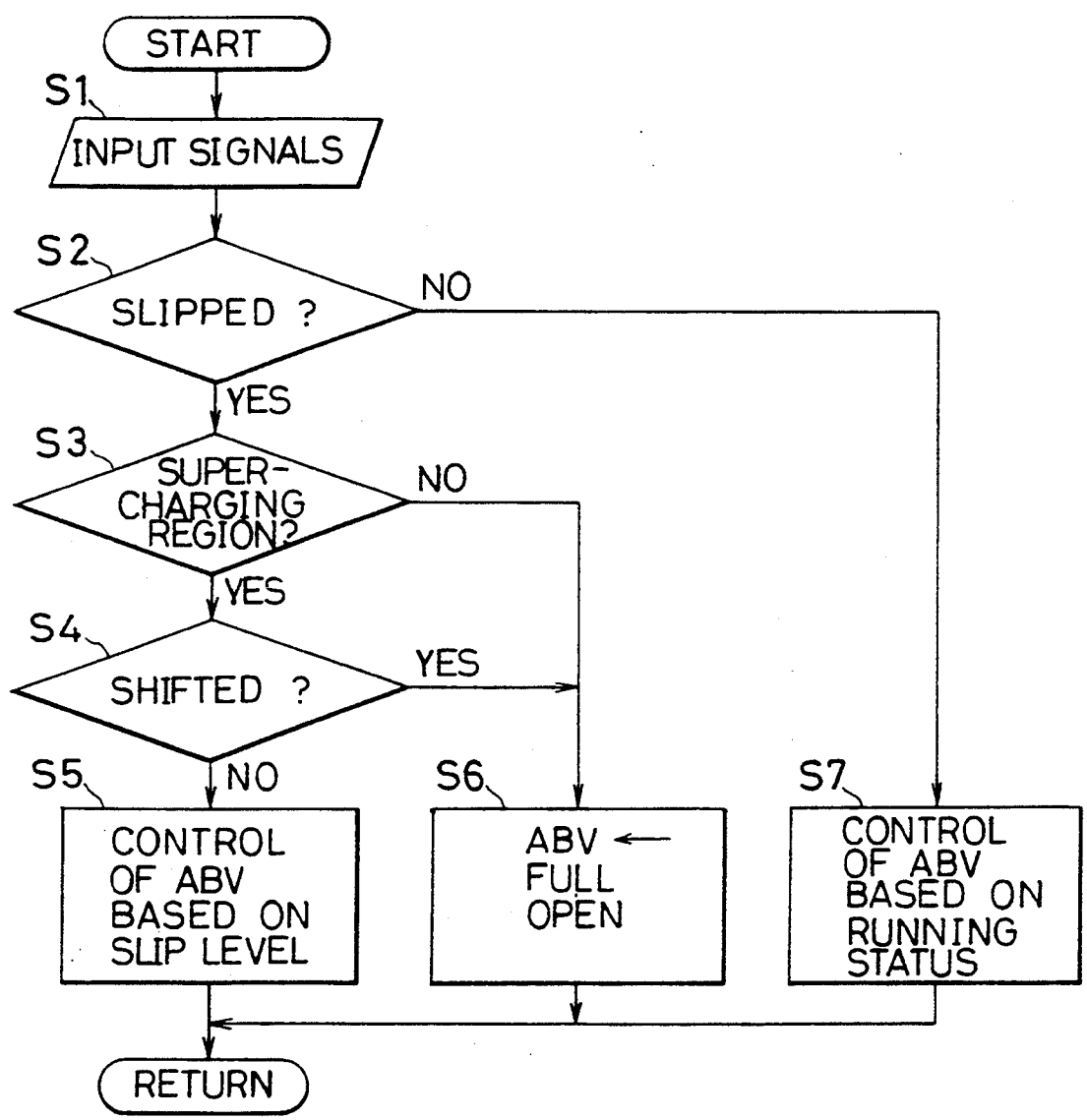
FIG. 3 is a flowchart showing an example for controlling a slip of a vehicle.

FIG. 3 is the flowchart showing the procedures for executing the control of the slip of the vehicle body by means of the engine control system according to this invention.

After the start of the program, various signals indicative of the number of engine revolutions, the angle of the opening of the throttle valve, the boost pressure, the speed of the driven and undriven wheels were entered at step S1, followed by step S2 at which it is decided to determine if a slip occurs on the basis of the difference in wheel speed between the driven and undriven wheels.

When the result of decision at step S2 indicates that the vehicle body is slipping, then the program flow goes to step S3 at which the running status of the engine exists in a supercharging region on the basis of the boost pressure. When it is decided at step S3 that the running status of the engine exists in the supercharging region, then the decision is made at step S4 to determine if the supercharging region has been shifted during the period of time when the slip was controlled in a non-supercharging region by ceasing the supply of fuel or by retarding the timing of ignition.

If the result of the decision at step S4 indicates that the running status of the engine has not been shifted to the supercharging region from the non-supercharging region in which the control of the slip was being conducted by ceasing the supply of fuel or by retarding the timing of ignition, then the program flow goes to step S5 at which the slip is controlled in a usual manner in which the control of the slip is conducted in a supercharging region. In other words, at step S5, the control of the pressure to be supercharged is executed by controlling the bypath control valve in accordance with the level of the slip as well as the supply of fuel and the timing of ignition are controlled in accordance with the running status of the engine.

On the other hand, when it is decided at step S4 that the supercharging region has been shifted from the non-supercharging region during the period of time when the slip was being controlled in the non-supercharging region by ceasing the supply of fuel or by retarding the timing of ignition, then the program flow goes to step S6 at which the supercharging operation was restricted by opening the bypath control valve to its full extent and the slip is controlled by ceasing the supply of fuel or by retarding the timing of ignition.

Further, if the result of the decision at step S3 indicates that the running status of the engine exists in the non-supercharging region, then the program flow goes to step S6 at which the bypath control valve is opened to its full extent and the slip is controlled by ceasing the supply of fuel or by retarding the timing of ignition.

When it is decided at step S2 that no slip occurs or the slip of the vehicle has already been converged, then the program flow goes to step S7 at which the bypath control valve is controlled in an ordinary manner in accordance with the running status of the engine as well as the supply of fuel and the timing of ignition are controlled in an ordinary manner in accordance with the running status of the engine.

Figure 4:
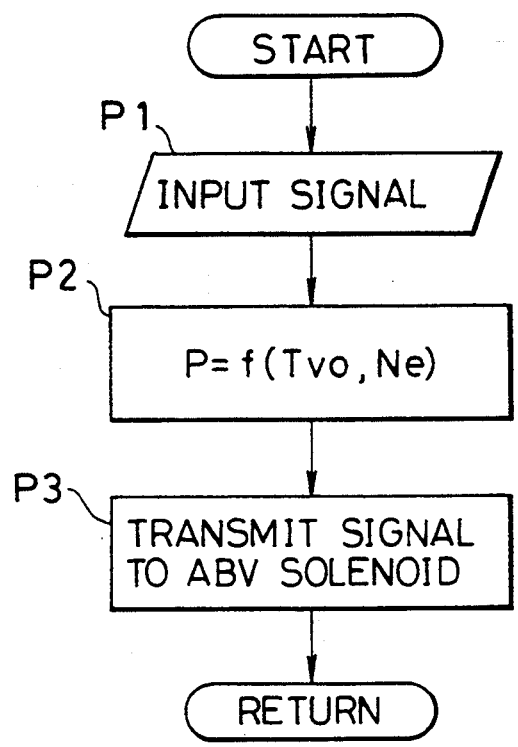
FIG. 4 is a flowchart showing an example for controlling a supercharging pressure when no slip is controlled.

FIG. 4 is the flowchart for the procedures for controlling the supercharging operation to be conducted at step S7 in FIG. 3. After the start of the program, various signals indicative of the angle of the opening of the throttle valve (TVO), the number of engine revolutions (Ne), and the like are entered at step P1, followed by Step P2 at which a target pressure (P) to be supercharged is read which is set as a function of TVO and Ne as well as a control signal is given to the solenoid valve of the bypath Control valve so as to reach or amount to the target pressure P.

In the embodiment as described hereinabove, a description is made on the slip of the vehicle in the non-supercharging region by either one of the operations for ceasing the supply of fuel and for retarding the timing of ignition. It should be noted, however, that the control of the slip can be conducted by combining the operation for ceasing the supply of fuel with the operation for retarding the timing of ignition. Further, the present invention can likewise be applied to a supercharging means other than the mechanical supercharger.

What is claimed is:

1. Ah engine control system for an internal combustion engine with a supercharger so adapted as to implement a supercharging operation having a running status by supplying intake air; comprising:
 a supercharging-region determining means for determining a supercharging region on the basis of a predetermined condition;
 a supercharging-operation controlling means for controlling a supercharging operation by implementing said supercharging operation by said supercharger when said supercharging region is determined by said supercharging-region determining means and by suspending said supercharging operation when said running status is determined thereby to be in a non-supercharging region;
 a slip detecting means for detecting a slip of a driven wheel driven by said engine relative to a road surface;
 a first slip control means for reducing torque of the engine by conducting at least one operation for ceasing the supply of fuel to the engine and for retarding the timing of ignition when the slip is detected by said slip detecting means in the non-supercharging region determined by said supercharging-region determining means;
 a second slip control means for reducing the torque of the engine by controlling said supercharger so as to lower a pressure to be supercharged prior to the control of the slip by said supercharging-operation controlling means when said slip is detected by said slip detecting means in the supercharging region determined by said supercharging-region determining means; and
 a control continuing means for continuing a control operation for controlling the slip by said first slip control means during a transient period of time until said supercharging operation is begun after said running status has been shifted into said supercharging region from said non-supercharging region during the control by said first slip control means.

2. An engine control system as claimed in claim 1, wherein said control continuing means is arranged to allow said first slip control means to continue the control of the slip until the time when the slip has been converged and no slip is detected by said slip detecting means.

3. An engine control system as claimed in claim 2, wherein said control continuing means is arranged to suspend an operation for supercharging by said supercharger prior to operations by said supercharging-operation controlling means and said second slip control means during said transient period of time when the slip is being controlled by said first slip control means.

4. An engine control system as claimed in claim 3, wherein the control by said supercharging-operation controlling means is begun after the slip of the vehicle has been converged and the control by said control continuing means has been released.

5. An engine control system as claimed in claim 1, wherein said predetermined condition is a running status of the engine.

6. An engine control system as claimed in claim 5, wherein:
 said running status of the engine is a pressure of intake air; and
 said supercharging-region determining means is arranged to determine said supercharging region when the pressure of intake air is equal to or greater than a predetermined value.

7. An engine control system as claimed in claim 1, Wherein the slip is controlled by said first slip control means by reducing an amount of fuel to be supplied to the engine and retarding a timing of ignition.

8. An engine control system as claimed in claim 1, wherein said supercharging-operation controlling means is arranged to control the pressure to be supercharged so as to reach a predetermined target pressure to be supercharged.

9. An engine control system as claimed in claim 8, wherein said predetermined target pressure is set on the basis of the number of engine revolutions and an engine load as parameters.

10. An engine control system as claimed in claim 1, wherein the slip is controlled by said second slip control means so as to lower the pressure to be supercharged at a greater rate as the extent of the slip detected by said slip detecting means becomes larger.

11. An engine control system as claimed in claim 1, wherein the slip is controlled by said first slip control means so as to reduce the amount of the supply of fuel or to retard the timing of ignition at a greater rate as the extent of the slip detected by said slip detecting means becomes larger.

12. An engine control system as claimed in claim 1, wherein:
   an intake passage of the engine is provided with a bypath bypassing said supercharger;
   said intake passage is provided with a control valve for adjusting an extent of an opening of said bypath; and
   the pressure to be supercharged is controlled by said control valve.

13. An engine control system as claimed in claim 12, wherein said control valve is controlled in the non-supercharging region by opening said bypath to its full extent.

14. An engine control system as claimed in claim 1, wherein the control of the slip by said first slip control means is inhibited during the control by said second slip control means.

15. An engine control system as claimed in claim 1, wherein said slip detecting means is arranged to detect a slip of the driven wheel on the basis of wheel speeds of the driven wheel and an undriven wheel.

* * * * *